United States Patent [19]

Wridt

[11] Patent Number: 5,020,205

[45] Date of Patent: Jun. 4, 1991

[54] FREEZE PLUG INSTALLER HEAD AND TOOL KIT INCLUDING SAME

[75] Inventor: Gerald A. Wridt, Racine, Wis.

[73] Assignee: Snap-on Tools Corporation, Kenosha, Wis.

[21] Appl. No.: 512,394

[22] Filed: Apr. 23, 1990

[51] Int. Cl.[5] ........ B23P 19/04

[52] U.S. Cl. ........ 29/275

[58] Field of Search ........ 29/254, 255, 275; 81/52.35, 8.4, 463; 269/75

[56] References Cited

U.S. PATENT DOCUMENTS

D 282,814 3/1986 Smith .
2,212,953 8/1940 Popp et al. ........ 269/75
2,447,562 8/1948 Burri ........ 269/75
3,064,342 11/1962 Wagoner .
3,102,744 9/1963 Reuter et al. ........ 269/75
3,710,655 1/1973 Brandle .
3,862,807 1/1975 Doden ........ 403/144
3,945,739 3/1976 Abe ........ 403/138
4,229,870 10/1980 Tate .
4,286,368 9/1981 Magana .
4,341,004 7/1982 Echols .
4,459,730 7/1984 Echols .
4,514,890 5/1985 Stewart .
4,637,115 1/1987 Hillock .

OTHER PUBLICATIONS

Snap-on Tools Corporation 1990 Catalog, p.103.
Snap-on Tools Corporation Drawing Nos. FPI6, FPI-6-2 and FPI6-4, Feb. 14, 1984.

*Primary Examiner*—Robert C. Watson
*Attorney, Agent, or Firm*—Emrich & Dithmar

[57] ABSTRACT

A freeze plug installation tool kit includes a drive tool having a coupling ball and a plurality of selectable carrier heads respectively sized for mating engagement with different-sized freeze plugs and detachably mountable on the coupling ball. Each carrier head has a cylindrical socket with an annular groove in which a split ring is disposed for snap engagement with the coupling ball to retain the ball in the socket. A flexible disk in the socket cooperates with the split ring to limit movement of the ball when it is retained in the socket.

17 Claims, 2 Drawing Sheets

FIG. 1
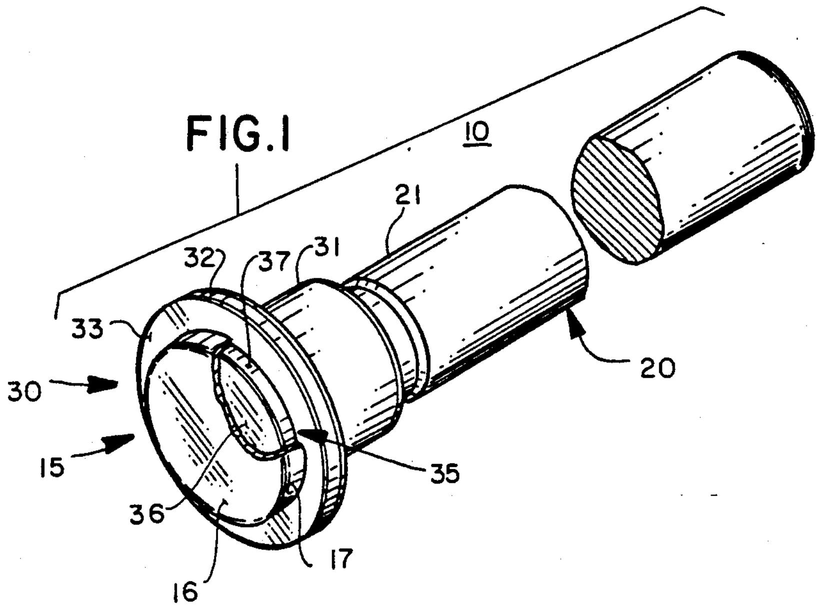
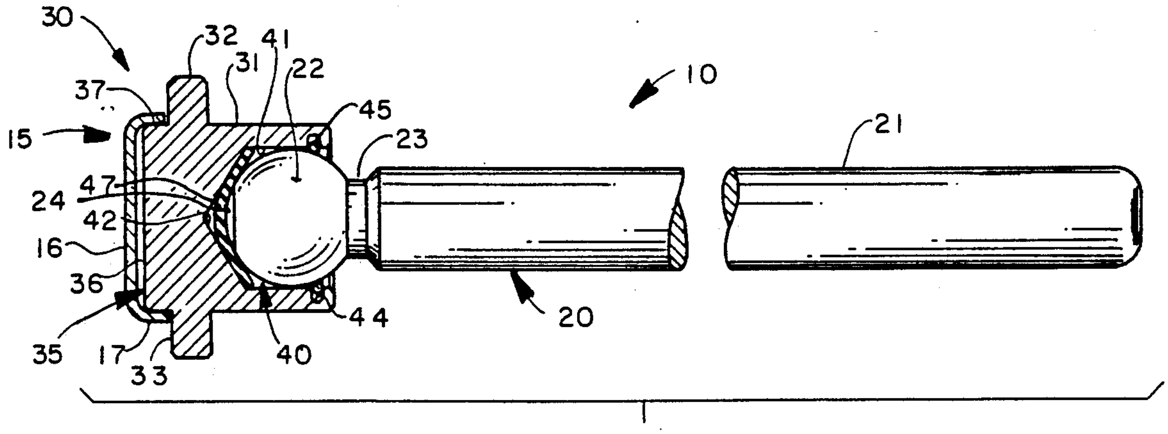
FIG. 2
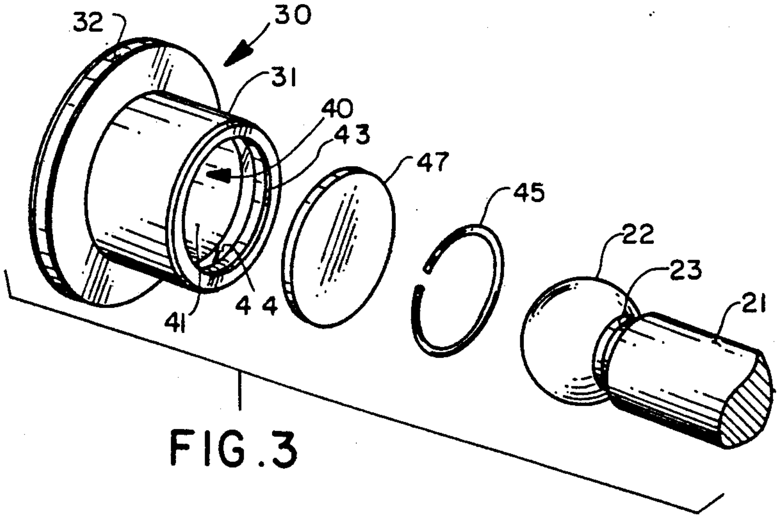
FIG. 3

FREEZE PLUG INSTALLER HEAD AND TOOL KIT INCLUDING SAME

BACKGROUND OF THE INVENTION

1. Field of the Invention

The present invention relates to tools for installing freeze plugs in automotive engine blocks, and particularly relates to detachable freeze plug carrier heads for such tools.

2. Description of the Prior Art

Internal combustion engine blocks of the water-cooled type commonly have a plurality of holes communicating with the cooling system and which are closed by freeze plugs respectively press-fitted thereinto. In the event that the cooling fluid freezes, for example if the owner forgets to put antifreeze in the system, the freeze plugs are pushed out of the holes by the expanding freezing fluid, thereby accommodating the expansion and preventing cracking of the engine block. In that event, or in the event of an engine overhaul, the freeze plugs must be replaced. The auto mechanic replaces the freeze plugs by the use of an installer tool which has a carrier head which matingly engages the freeze plug for pushing it back into the engine block hole.

It is known to provide freeze plug installer tool kits which include a drive tool and a plurality of carrier heads, respectively mateable with different sizes of freeze plugs, and all detachably mountable on a coupling ball on the drive tool. More specifically, in these prior art devices the carrier head has a socket for receiving the coupling ball and threadedly engages a coupling ring which has a retaining lip of a diameter less than that of a coupling ball for securely holding the carrier head in place on the ball. But this is a relatively complicated and expensive two-piece head arrangement which is characterized by a relatively time-consuming assembly.

SUMMARY OF THE INVENTION

It is a general object of the present invention to provide an improved freeze plug installation tool assembly which avoids the disadvantages of prior devices while affording additional structural and operating advantages.

An important feature of the present invention is the provision of a freeze plug carrier head which is of relatively simple and economical construction and which is characterized by ease of attachment to an associated drive tool.

In connection with the foregoing feature, it is another feature of the invention to provide a freeze plug carrier head of the type set forth which can be simply pushed onto and pulled off of an associated drive tool.

Still another feature of the invention is the provision of a drive tool assembly incorporating a carrier head of the type set forth.

Yet another feature of the invention is the provision of a freeze plug installation tool kit which includes a drive tool and a plurality of carrier heads of the type set forth, sized for installation of different sizes of freeze plug.

These and other features of the invention are attained by providing a freeze plug carrier head for a freeze plug installer tool having a coupling ball, the carrier head comprising: a body, carrier means on the body adapted for mating engagement with an associated freeze plug, a socket formed in the body and dimensioned for receiving the coupling ball therein, and retaining means carried by the body and movable between a normal condition resiliently projecting laterally into the socket for interference with the passage of the coupling ball into and out of the socket and a retracted condition accommodating passage of the coupling ball into and out of the socket, the retaining means being adapted for camming engagement with the coupling ball for movement of the retaining means to its retracted condition as the coupling ball is moved into and out of the socket, the retaining means resiliently returning to its normal condition when the coupling ball is disposed in the socket for retaining the coupling ball in the socket, thereby to retain the carrier head on the tool.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a tool assembly including a drive tool and a freeze plug carrier head, constructed in accordance with and embodying the features of the present invention, with a portion of the drive tool removed and with the carrier head shown engaged with an associated freeze plug;

FIG. 2 is a reduced side elevational view of the tool assembly of FIG. 1, with the carrier head and freeze plug shown in vertical section, and with a portion of the drive tool removed;

FIG. 3 is a fragmentary, exploded, perspective view of the tool assembly of FIG. 2;

DESCRIPTION OF THE PREFERRED EMBODIMENT

Figure 4:
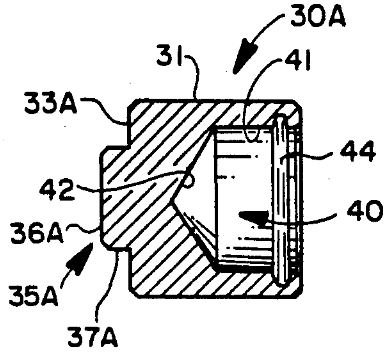
FIG. 4 is a view in vertical section of another carrier head in accordance with the present invention, like that of FIG. 2, but adapted for use with a different size freeze plug.

Referring to FIGS. 1-3, there is illustrated a freeze plug installation tool assembly, generally designated by the numeral 10, constructed in accordance with and embodying the features of the present invention, for use in installing a freeze plug 15 in a complementary bore or hole in the block of an internal combustion engine (not shown). The freeze plug 15 is generally cup-shaped, having a circular end wall 16 and a cylindrical side wall 17.

The tool assembly 10 includes a drive tool 20 having an elongated shank 21, carrying at one end a coupling ball 22 which is unitary with a necked-down portion 23 of the shank 21. The necked-down portion 23 meets the coupling ball 22 at a truncation plane which is substantially perpendicular to the longitudinal axis of the shank 21 and is parallel to a flat or truncated end surface 24 formed at the distal end of the coupling ball 22.

The tool assembly 10 includes a freeze plug carrier head 30, which is adapted to be detachably mounted on the coupling ball 22 of the drive tool 20. The carrier head 30 includes a generally cylindrical body 31, having a radially outwardly extending annular flange 32 adjacent to one end thereof defining an annular stop surface 33. Projecting axially from the stop surface 33 is a cylindrical carrier land 35 having a flat, circular end surface 36 and a cylindrical side surface 37 which terminates at the stop surface 33. The carrier land 35 is dimensioned for receiving thereon, in a force fit, the associated freeze plug 15 to be installed.

Figure 5:
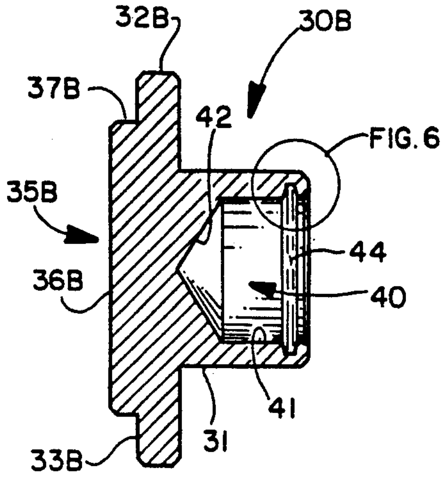
FIG. 5 is a view similar to FIG. 4 of another size of carrier head in accordance with the present invention.
Figure 6:
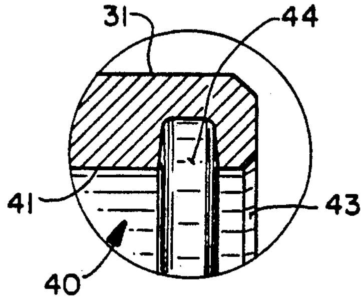
FIG. 6 is an enlarged, fragmentary view of a portion of the carrier head of FIG. 5.

Formed axially in the other end of the body 31 is a socket 40 having a circularly cylindrical side wall 41 and a frustoconical inner end wall 42. The cylindrical side wall 41 has a diameter very slightly greater than the diameter of the coupling ball 22. Referring also to FIGS. 5 and 6, the outer end of the cylindrical side wall 41 is provided with a chamfered entry surface 43. Formed in the cylindrical side wall 41 adjacent to the entry end of the socket 40 is an annular groove or recess 44, in which is disposed a split ring 45. The ring 45 is so dimensioned that, in its normal rest position in the groove 44, it has an inner diameter less than that of the cylindrical side wall 41 so as to project radially into the socket 40. Seated in the socket 40 is a flexible disk 47, which may be formed of rubber, and which, in its normal rest condition, has a diameter slightly greater than that of the cylindrical side wall 41, so that it must be flexed into a slightly concave configuration to be seated in the bottom of the socket 40, as illustrated in FIG. 2.

Figure 7:
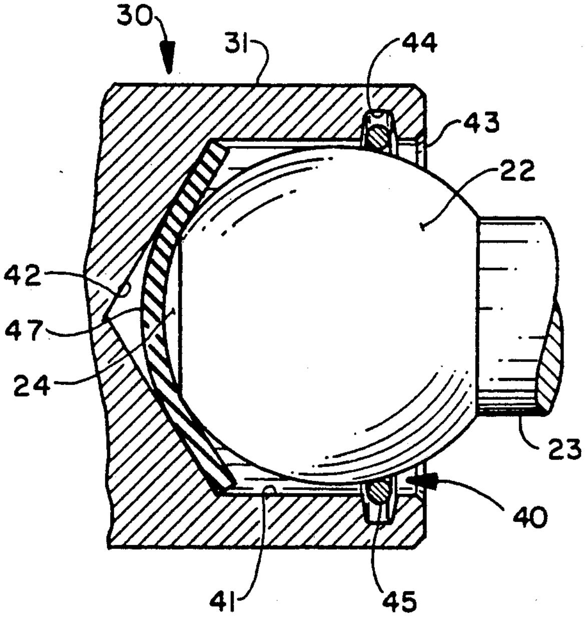
FIG. 7 is a further enlarged, fragmentary view in vertical section of the carrier head and coupling ball of the tool assembly of FIG. 2.
Figure 8:
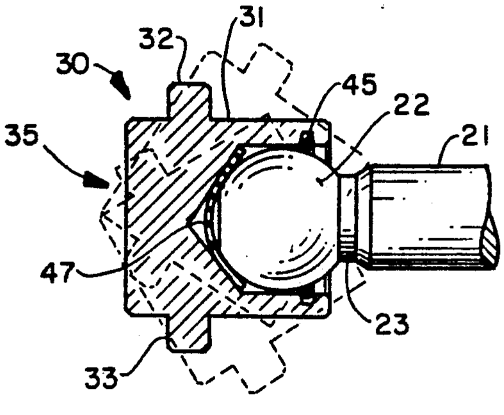
FIG. 8 is a fragmentary side elevational view of the carrier head and drive tool of FIG. 2, illustrating pivotal movement of the carrier head with respect to the drive tool.

Referring now also to FIGS. 7 and 8, the operation of the tool assembly 10 will be described. In operation, when it is desired to install the freeze plug 15, the carrier head 30 is mounted on the coupling ball 22 by pushing the ball 22 into the socket 40. Since the diameter of the ball 22 is greater than that of the split ring 45, it will cammingly engage the ring 45, spreading it into the groove 44 to a retracted condition to allow the ball 22 to pass into the socket 40. The ball 22 is pushed into the socket 40 until it contacts the flexible disk 47. As the maximum diameter of the ball 22 passes the split ring 45, the ring 45 recloses to its normal rest condition, as illustrated in FIG. 7. In this configuration, the split ring 45 retains the ball 22 in the socket 40 and cooperates with the flexible disk 47 to limit axial movement of the ball 22 in the socket 40.

The freeze plug 15 is then press fitted onto the carrier land 35, as illustrated in FIGS. 1 and 2, until the side wall 17 thereof bottoms on the stop surface 33. The freeze plug 15 is then installed in the associated engine block. For this purpose, it will be appreciated that the fit of the coupling ball 22 and the socket 40 accommodates relative pivotal movement therebetween, as illustrated in FIG. 8, to facilitate manipulation of the tool assembly 10 in close quarters.

Different types of automotive engine blocks utilize different sizes of freeze plugs. Accordingly, it is an aspect of the present invention to provide the tool assembly 10 as part of a tool kit which includes a plurality of carrier heads, respectively sized for mating engagement with a plurality of different sizes of freeze plug. Two such different sizes of carrier head are respectively illustrated in FIGS. 4 and 5, and are respectively designated by the numerals 30A and 30B. The carrier heads 30A and 30B are substantially identical to the carrier head 30, with the exception of the diameter of the carrier land 35 and the presence and diameter of the annular flange 32. Accordingly, those portions of the carrier heads 30A and 30B which are identical to the corresponding portions of the carrier head 30 bear the same reference numerals, while those which are of different size from the carrier head 30 are respectively designated by like reference numerals with the suffixes A or B. In the carrier head 30A, the carrier land 35A is sufficiently small that no flange is necessary. In the carrier head 30B, the carrier land 35B had a diameter greater than that of the body 31 and, accordingly, the flange 32B must be of a correspondingly greater diameter.

It will be appreciated that the present invention affords a tool assembly of simple and economical construction which is characterized by ease of assembly, the carrier heads 30, 30A and 30B being simply pushed onto and pulled off of the coupling ball 22.

I claim:

1. A freeze plug carrier head for a freeze plug installer tool having a coupling ball, said carrier head comprising: a body, carrier means on said body adapted for mating engagement with an associated freeze plug, a socket formed in said body and dimensioned for receiving the coupling ball therein, retaining means carried by said body and movable between a normal rest condition resiliently projecting laterally into said socket for interference with the passage of the coupling ball into and out of said socket and a retracted condition accommodating passage of the coupling ball into and out of said socket, said retaining means in its normal rest condition being adapted for camming engagement with the coupling ball for movement of said retaining means to its retracted condition as the coupling ball is moved into and out of said socket, said retaining means resiliently returning to its normal condition when the coupling ball has moved past said retaining means, whereby when said coupling ball is disposed in said socket said retaining means serves to detachably retain said carrier head on the tool, and a flexible disk having a diameter greater than that of said socket and seated in said socket for contact with the coupling ball, said disk cooperating with said retaining means for limiting movement of the coupling ball when it is retained in said socket.

2. The carrier head of claim 1, wherein said retaining means extends substantially around the entire perimeter of said socket.

3. The carrier head of claim 1, wherein said socket includes a peripheral recess adjacent to the open end thereof, said retaining means being disposed in said recess.

4. The carrier head of claim 3, wherein said socket is substantially circular in transverse cross section, said peripheral recess comprising a radially outwardly extending annular groove adjacent to the open end of said socket, said retaining means including a resilient ring disposed in said groove.

5. The carrier head of claim 4, wherein said ring is a split ring.

6. The carrier head of claim 5, wherein said ring has a normal rest diameter less than that of the coupling ball.

7. The carrier head of claim 1, wherein said socket includes a chamfered entry surface around the perimeter thereof at the open end thereof.

8. The carrier head of claim 1, wherein said socket is substantially circularly cylindrical and has a frustoconical end surface at the inner end thereof.

9. A tool assembly for installing a freeze plug in an automotive engine block comprising: a drive shank; a coupling ball carried by said shank at one end thereof; and a freeze plug carrier head detachably mountable on said coupling ball, said carrier head including a body, carrier means on said body adapted for mating engagement with an associated freeze plug, a socket formed in said body and dimensioned for receiving said coupling ball therein, retaining means carried by said body and movable between a normal rest condition resiliently projecting laterally into said socket for interference with the passage of said coupling ball into and out of said socket and a retracted condition accommodating passage of said coupling ball into and out of said socket, said retaining means in its normal rest condition being adapted for camming engagement with said coupling ball for movement of said retaining means to its retracted condition as said coupling ball is moved into and out of said socket, said retaining means resiliently returning to its normal condition when said coupling ball has moved past said retaining means, whereby when said coupling ball is disposed in said socket said retaining means serves to detachably retain said carrier head on said shank, and a flexible disk having a diameter greater than that of said socket and seated in said socket for contact with the coupling ball, said disk cooperating with said retaining means for limiting movement of the coupling ball when it is retained in said socket.

10. The tool assembly of claim 9, wherein said coupling ball is unitary with said drive shank.

11. The tool assembly of claim 9, wherein said coupling ball has a flattened distal end.

12. The tool assembly of claim 9, wherein said socket includes a peripheral recess, said retaining means being disposed in said recess.

13. The tool assembly of claim 12, wherein said socket is substantially circular in transverse cross section, said recess being an annular groove in the wall of said socket, said retaining means including a split ring disposed in said groove.

14. The tool assembly of claim 9, and further comprising a chamfered entry surface at the open end of said socket extending around the perimeter thereof.

15. A freeze plug installation tool kit comprising: a drive tool including a coupling ball; and a plurality of selectable carrier heads respectively adapted for mating engagement with different sizes of associated freeze plugs, each of said carrier heads having formed therein a socket dimensioned for receiving said coupling ball therein, said socket being substantially circularly cylindrical and having a frustoconical end surface at the inner end thereof, retaining means carried by said head and movable between a normal rest condition resiliently projecting laterally into said socket for interference with the passage of said coupling ball into and out of said socket and a retracted condition accommodating passage of said coupling ball into and out of said socket, said retaining means in its normal rest condition being adapted for camming engagement with said coupling ball for movement of said retaining means to its retracted condition as said coupling ball is moved into and out of said socket, said retaining means resiliently returning to its normal condition when said coupling ball has moved past said retaining means, whereby when said coupling ball is disposed in said socket said retaining means serves to detachably retain said carrier head on said drive tool, and a flexible disk having a diameter greater than that of said socket and seated in said socket for contact with the coupling ball, said disk cooperating with said retaining means for limiting movement of the coupling ball when it is retained in said socket.

16. The tool kit of claim 15, wherein said socket includes an annular groove in the side wall thereof, said retaining means including a split ring disposed in said groove.

17. The tool kit of claim 15, wherein each of said sockets includes a chamfered surface at the open end thereof extending around the perimeter thereof.

* * * * *